United States Patent
Dong et al.

(10) Patent No.: US 11,789,163 B2
(45) Date of Patent: Oct. 17, 2023

(54) NAVIGATION BOARD, MULTI-SOURCE DATA FUSION METHOD FOR NAVIGATION BOARD AND TRANSPORTER

(71) Applicant: SHANGHAI HUACE NAVIGATION TECHNOLOGY LTD, Qingpu District Shanghai (CN)

(72) Inventors: Shengfei Dong, Shanghai (CN); Haifeng Deng, Shanghai (CN); Yan Gao, Shanghai (CN); Qingqing Wang, Shanghai (CN); Xiangzhen Dang, Shanghai (CN); Jianbo Wang, Shanghai (CN); Hanxu Luo, Shanghai (CN); Jun Wang, Shanghai (CN)

(73) Assignee: SHANGHAI HUACE NAVIGATION TECHNOLOGY LTD, Qingpu District Shanghai (CN)

( * ) Notice: Subject to any disclaimer, the term of this patent is extended or adjusted under 35 U.S.C. 154(b) by 426 days.

(21) Appl. No.: 17/051,677

(22) PCT Filed: May 26, 2020

(86) PCT No.: PCT/CN2020/092321
§ 371 (c)(1),
(2) Date: Oct. 29, 2020

(87) PCT Pub. No.: WO2021/208190
PCT Pub. Date: Oct. 21, 2021

(65) Prior Publication Data
US 2023/0098511 A1    Mar. 30, 2023

(30) Foreign Application Priority Data
Apr. 14, 2020   (CN) .......................... 202010288979.2

(51) Int. Cl.
*G01S 19/47*        (2010.01)
*G01S 19/39*        (2010.01)
(Continued)

(52) U.S. Cl.
CPC .............. *G01S 19/47* (2013.01); *G01S 19/35* (2013.01); *G01S 19/393* (2019.08); *G01S 19/40* (2013.01); *G01S 19/396* (2019.08)

(58) Field of Classification Search
CPC ........ G01S 19/47; G01S 19/49; G01S 19/393; G01S 19/00–55
See application file for complete search history.

(56) References Cited

U.S. PATENT DOCUMENTS 6,317,688 B1 * 11/2001 Bruckner ................ G01S 19/08
                                                                701/472
9,014,975 B2 *  4/2015 Brashear ............ G01C 21/1654
                                                                701/472
(Continued)

FOREIGN PATENT DOCUMENTS

CN       102879793 A    1/2013
CN       204731643 U   10/2015
(Continued)

OTHER PUBLICATIONS

Extended European Search Report issue din European Patent Application No. 20793549.5 dated Apr. 12, 2022.
(Continued)

*Primary Examiner* — Cassi J Galt
(74) *Attorney, Agent, or Firm* — Mark H. Whittenberger; Holland & Knight LLP (57) ABSTRACT

Provided is a navigation board, a multi-source data fusion method for a navigation board and a transporter. The navigation board includes a printed circuit board, a global navigation satellite system module, an inertial sensor, a (Continued)

processor, and a data interface; the processor is configured to execute a large misalignment angle initialization algorithm, an inertial strapdown solution algorithm, and a multi-source data fusion solution; and a size of the navigation board is smaller than or equal to a size of a standard GNSS board, and the navigation board at least includes the same data interface as a data interface of the standard GNSS board.

9 Claims, 5 Drawing Sheets

(51) Int. Cl.
*G01S 19/35* (2010.01)
*G01S 19/40* (2010.01)

(56) References Cited

U.S. PATENT DOCUMENTS

| | | | |
|---|---|---|---|
| 9,453,921 B1* | 9/2016 | Bell | G01S 19/49 |
| 9,778,043 B1 | 10/2017 | Johnson | |
| 10,228,252 B2 | 3/2019 | Georgy et al. | |
| 10,429,196 B2 | 10/2019 | Al-Hamad et al. | |
| 2010/0211315 A1 | 8/2010 | Toda | |
| 2017/0212248 A1* | 7/2017 | Bobye | G01S 19/53 |

FOREIGN PATENT DOCUMENTS

| | | |
|---|---|---|
| CN | 105823484 A | 8/2016 |
| CN | 205643716 U | 10/2016 |
| CN | 107544533 A | 1/2018 |
| CN | 107643535 A | 1/2018 |
| CN | 108616810 A | 10/2018 |
| CN | 109764870 A | 5/2019 |
| CN | 109991640 A | 7/2019 |
| CN | 110780326 A | 2/2020 |
| TW | 524985 B | 3/2003 |

OTHER PUBLICATIONS

Qiu, W., "GNSS SINS (Research on a GNSS/SINS Integrated Navigation Algorithm)" Chinese Master's Theses Full-text Database (Information Science and Technology), No. 12, Jan. 15, 2019, ISSN: 1674-0246 (English abstract).
International Search Report issued in International Patent Application No. PCT/CN2020/092321 dated Jan. 22, 2021.

* cited by examiner

NAVIGATION BOARD, MULTI-SOURCE DATA FUSION METHOD FOR NAVIGATION BOARD AND TRANSPORTER

CROSS-REFERENCE TO RELATED APPLICATIONS

This application is a U.S. National Stage of International Patent Application No. PCT/CN2020/092321, filed on May 26, 2020, which claims priority to Chinese Patent Application No. 202010288979.2, filed on Apr. 14, 2020. The disclosure of each application is incorporated herein by reference in their entirety.

TECHNICAL FIELD

The embodiments of the present application relate to the technical field of navigation, for example, to a navigation board, a multi-source data fusion method for a navigation board, and a transporter.

BACKGROUND

With the development of navigation technologies, the requirements for navigation precision are becoming higher and higher.

In urban canyons, building forests and other environments, a positioning signal of the Global Navigation Satellite System (GNSS) is easily blocked and disturbed, which causes a decrease of the precision of navigation and positioning and even interruption of the navigation and positioning, and the continuity and reliability of navigation and positioning of the GNSS are poor. In addition, the frequency of GNSS positioning data is low, which cannot satisfy the dynamic requirements of high-dynamic application scenarios. The combined navigation and positioning technology of GNSS and Inertial Navigation System (INS) fully utilizes the advantages of the satellite navigation and positioning technology and the inertial navigation and positioning technology, and well makes up for the defects of the satellite navigation and positioning technology and the inertial navigation and positioning technology. The combined navigation and positioning technology of GNSS and INS can provide customers with high-precision, high-dynamic, continuous and reliable navigation and positioning services. Therefore, users have a strong demand for combined navigation products of GNSS and INS in application fields such as automatic driving, trajectory tracking, and intelligent control.

However, in the related art, most of the combined navigation products of GNSS and INS integrate a separate GNSS board and an INS module in one housing, which is not conducive to the replacement and upgrade of the original GNSS board in a transporter.

SUMMARY

The present application provides a navigation board, a multi-source data fusion method for the navigation board and a transporter to integrate the GNSS module and the inertial sensor on one PCB board, and then, on the basis of achieving the combined navigation and positioning of GNSS and INS, the size of the combined navigation and positioning product is reduced, so that the standard GNSS board in the related art can be directly replaced by the navigation board.

First, an embodiment of the present application provides a navigation board. The navigation board includes a printed circuit board, a Global Navigation Satellite System (GNSS) module, an inertial sensor, a processor, and a data interface, where the data interface of the navigation board includes an external sensor interface; the GNSS module is configured to track and analyze a GNSS satellite signal and execute a GNSS navigation and positioning solution; the inertial sensor is configured to measure a three-dimensional inertial angular velocity and a three-dimensional inertial acceleration of the navigation board; the processor is configured to execute a large misalignment angle initialization algorithm, an inertial strapdown solution algorithm and a multi-source data fusion solution according to an operation result of the GNSS module, a measurement result of the inertial sensor and an observation result of an external sensor; the GNSS module, the inertial sensor and the processor are integrated on the printed circuit board, and the GNSS module and the inertial sensor are electrically connected to the processor through a circuit on the printed circuit board; and a size of the navigation board is smaller than or equal to a size of a standard GNSS board, and the data interface of the navigation board at least includes a data interface which is same as a data interface of the standard GNSS board.

Second, an embodiment of the present application also provides a multi-source data fusion method for a navigation board, performed by the navigation board according to the first and including: acquiring synchronously, by a processor, observation data of the external sensor, the inertial sensor and the GNSS module; executing, by the processor, the large misalignment angle initialization algorithm to initialize a navigation and positioning state, and determining an initial attitude, an initial velocity, and an initial position; acquiring periodically, by the processor, observation values of an angular velocity and an acceleration of the inertial sensor by taking the initial attitude, the initial velocity and the initial position respectively as an attitude, a velocity and a position at a starting moment of inertial navigation and positioning, and executing the inertial strapdown solution algorithm to perform an inertial navigation and positioning solution, to obtain a first attitude, a first velocity and a first position; and obtaining, by the processor, a new attitude, a new velocity and a new position by performing a fusion solution on observation data of a second position, a second velocity and a second attitude solved by the GNSS module, observation data of a third position, a third velocity and a third attitude acquired by the external sensor, and results of the first attitude, the first velocity and the first position, and taking the new attitude, the new velocity and the new position as navigation results for output.

Third, an embodiment of the present application also provides a multi-source data fusion method for a navigation board, performed by the navigation board according to the first and including: acquiring synchronously, by the processor, observation data of the external sensor, the inertial sensor and the GNSS module; executing, by the processor, the large misalignment angle initialization algorithm to initialize a navigation and positioning state, and determining an initial attitude, an initial velocity, and an initial position; acquiring periodically, by the processor, observation values of an angular velocity and an acceleration of the inertial sensor by taking the initial attitude, the initial velocity and the initial position respectively as an attitude, a velocity and a position at a starting moment of inertial navigation and positioning, and executing the inertial strapdown solution algorithm to perform an inertial navigation and positioning solution, to obtain a first attitude, a first velocity and a first position; and obtaining, by the processor, a new attitude, a new velocity and a new position by performing a fusion solution on fourth observation data, observation data of a third attitude, a third velocity and a third position acquired by the external sensor, and results of the first attitude, the first velocity and the first position, and taking the new attitude, the new velocity and the new position as navigation results for output, wherein the fourth observation data comprises a pseudo-range, a carrier phase and a doppler original observation quantity acquired by the GNSS module.

Fourth, the embodiment of the application also provides a transporter, where the navigation board according to the first is mounted on the transporter at any angle.

DETAILED DESCRIPTION

The present application will be described in further detail below with reference to the drawings and embodiments. It should be understood that the specific embodiments described herein are only used to explain the present application, rather than limit the present application. In addition, it should be noted that, for the convenience of description, merely the parts related to the present application and not the whole structure are shown in the drawings.

Figure 1:
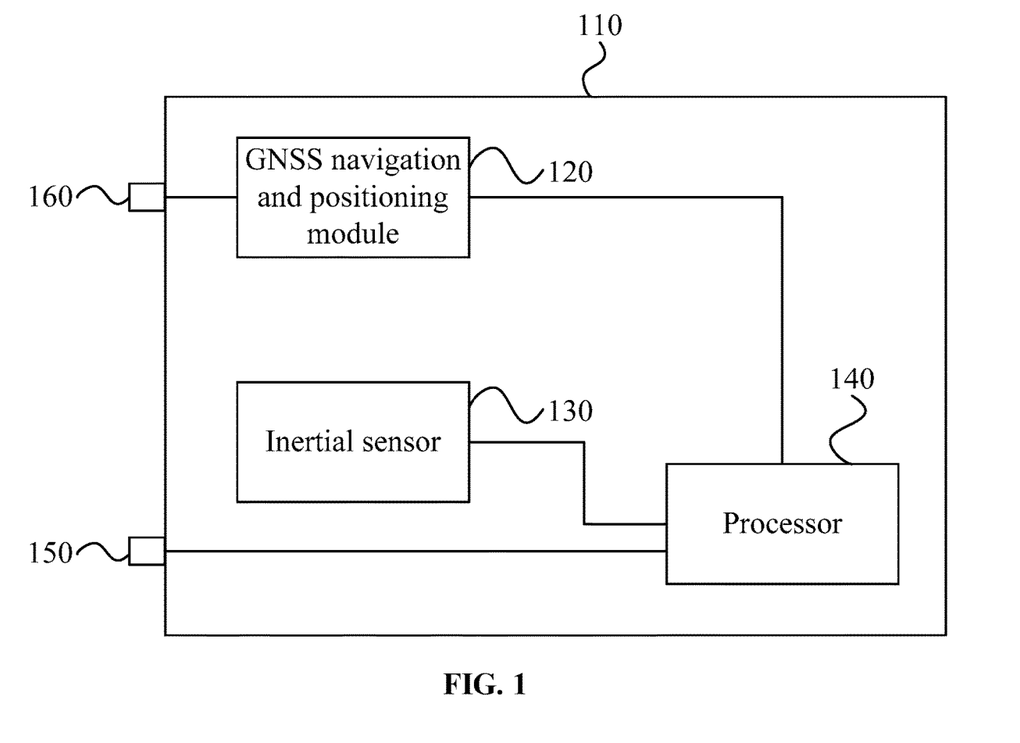
FIG. 1 is a structural diagram of a navigation board according to an embodiment of the present application.

As described in the BACKGROUND, the combined navigation product of GNSS and INS in the related art mostly integrate the separate GNSS board and the INS module in one housing, which is not conducive to the replacement and upgrade of the original board in the GNSS equipment. The inventor found that the reason for the above-mentioned problems is as follows: in the combined navigation product of GNSS and INS, the GNSS board and the INS module are separate modules, and the size of the INS module used in the combined navigation product of GNSS and INS in the related art is larger, which makes the size of the combined navigation product of GNSS and INS larger, and the size of the GNSS board mounted in the transporter in the related art is usually smaller, which makes the space for mounting the GNSS board not enough to accommodate the combined navigation product of GNSS and INS. In addition, the data interface of the combined navigation product of GNSS and INS in the related art is also inconsistent with the data interface of the GNSS board, which further makes it impossible to directly replace and upgrade the existing GNSS board in the transporter in the combined navigation product of GNSS and INS. The GNSS board mounted on the transporter has no requirements for the mounting direction and can be mounted at any angle, and the combined navigation product of GNSS and INS in the related art generally has certain requirements for the mounting direction on the transporter, which further makes it impossible to directly replace the GNSS board in the transporter in the combined navigation product of GNSS and INS in the related art Based on the above reasons, an embodiment of the present application provides a navigation board. FIG. 1 is a structural diagram of a navigation board according to an embodiment of the present application. Referring to FIG. 1, the navigation board includes: a Printed Circuit Board (PCB) board 110, a GNSS module 120, an inertial sensor 130, a processor 140, and a data interface 150. The data interface 150 includes an external sensor interface; the GNSS module 120 is configured to track and analyze a GNSS satellite signal and execute GNSS navigation and positioning solution; the inertial sensor 130 is configured to measure a three-dimensional inertial angular velocity and a three-dimensional inertial acceleration of the navigation board; the processor 140 is configured to execute a large misalignment angle initialization algorithm, an inertial strapdown solution algorithm, and a multi-source data fusion solution according to an operation result of the GNSS module 120, a measurement result of the inertial sensor 130, and an observation result of an external sensor; the GNSS module 120, the inertial sensor 130 and the processor 140 are integrated on the PCB board 110, and the GNSS module 120 and the inertial sensor 130 are electrically connected to the processor 140 through a circuit on the PCB board 110; a size of the navigation board is smaller than or equal to a size of a standard GNSS board, and the data interface of the navigation board at least includes a data interface 150 which is same as a data interface 150 of the standard GNSS board.

In some embodiments, the PCB board 110 is a printed circuit board, and serves as a bearing board for the GNSS module 120, the inertial sensor 130 and the processor 140, and the GNSS module 120, the inertial sensor 130 and the processor 140 are integrated on the PCB board 110 to further achieve integration of the GNSS module 120 and the inertial sensor 130. In some embodiments, the inertial sensor 130 is equivalent to the INS module of the combined navigation product of GNSS and INS in the related art. A circuit structure is disposed on the PCB board 110, the GNSS module 120 is electrically connected to the processor 140 through the circuit structure on the PCB board 110, and the inertial sensor 130 is electrically connected to the processor 140 through the circuit structure on the PCB board 110. The size of the navigation board is smaller than or equal to the size of the standard GNSS board, and the navigation board includes at least the data interface 150 which is same as the data interface 150 of the standard GNSS board. Optionally, a model of the GNSS module 120 is UBLOXF9P or UBLOXM8T. Optionally, a model of the processor 140 is IMX.RT1052, STM32H7 or SAMA5D27. The processors 140 of the above models are integrated with Random-Access Memories (RAM)/Double Data Rate (DDR) internally, the number of peripheral devices is small, a minimum system size of the processor 140 is small, and the degree of integration is high. Optionally, a model of the inertial sensor 130 is ADIS505, IMU330 or SCC2X30, and compared with the INS module in the combined navigation product of GNSS and INS in the related art, the inertial sensors 130 of the above models have the advantages of small package and high performance. A size of the GNSS module 120 of the model UBLOXF9P or UBLOXM8T and a size of the processor 140 of the model IMX.RT1052, STM32H7 or SAMA5D27 are also smaller, and thus the overall size of the navigation board in this embodiment can be smaller. In addition, the size of the navigation board may be designed to be smaller than or equal to the size of the standard GNSS board, so that the space for mounting the GNSS board in the transporter in the related art can be accommodated with the navigation board provided by this embodiment, thereby facilitating the direct replacement of the GNSS board in the transporter with the navigation board. In addition, since the navigation board in this embodiment includes at least the data interface 150 which is same as the data interface 150 of the standard GNSS board, after the navigation board replaces the original GNSS board in the transporter, a line originally connected to the data interface 150 of the GNSS board in the transporter is directly connected to the corresponding data interface 150 of the navigation board, so that normal working can be ensured after the GNSS board in the transporter is replaced with the navigation board card in this embodiment.

In some embodiments, the data interface 150 of the navigation board is electrically connected to the processor 140.

Optionally, the navigation board further includes an antenna interface 160 of the GNSS module 120, which is configured to connect an external GNSS antenna to receive GNSS signals.

Optionally, the external sensor interface is configured to receive at least one of odometer data, millimeter-wave radar data, lidar data, visual sensor data, or map data.

In some embodiments, the GNSS module 120 may include a GNSS signal capture and analysis unit and a GNSS navigation and positioning unit, where the GNSS signal capture and analysis unit is configured to track and analyze GNSS satellite signals, and the GNSS navigation and positioning unit is configured to perform GNSS navigation and positioning solution according to the GNSS satellite signals to obtain data such as the pseudo-range, carrier phase and doppler original observation quantity. The inertial sensor 130 includes at least a tri-axial Micro-Electro-Mechanical System (MEMS) accelerometer and a tri-axial MEMS gyroscope, and may be optionally configured with a temperature sensor and a tri-axial magnetometer. The tri-axial MEMS accelerometer may be configured to measure a three-dimensional inertial acceleration of the navigation board, and the tri-axial gyroscope may be configured to measure a three-dimensional inertial angular velocity of the navigation board.

The processor 140 may execute a large misalignment angle initialization algorithm, an inertial strapdown solution algorithm, and a multi-source data fusion algorithm according to an operation result of the GNSS module 120, a measurement result of the inertial sensor 130, and an observation result of the external sensor. In some embodiments, the processor 140 executes the large misalignment angle initialization algorithm to initialize a navigation and positioning state, determine an initial attitude, an initial velocity and an initial position, and then regardless of the mounting direction of the navigation board, the processor 140 can determine each piece of initial data of the navigation board, especially the initial attitude, so that the initial data can be provided for the subsequent navigation and positioning calculation. Therefore, for the navigation board provided by this embodiment, the initial attitude, the initial velocity, and the initial position of the navigation board are determined through the large misalignment angle initialization algorithm adopted by the processor 140, so that when the navigation board is mounted, the navigation board can be mounted at any angle like the GNSS board in the related art, without restrictions to the mounting direction. For the process of the large misalignment angle initialization algorithm, reference may be made to an embodiment of the multi-source data fusion method for the navigation board described below in the present application.

When the processor 140 executes the inertial strapdown solution algorithm, the initial attitude, the initial velocity and the initial position are taken as an attitude, a velocity and a position of a starting moment of inertial navigation and positioning, respectively, observation values of an angular velocity and acceleration of the inertial sensor 130 are periodically acquired, and the inertial strapdown solution algorithm is executed to perform inertial navigation and positioning solution to obtain a first attitude, a first velocity and a first position; for the process of the inertial strapdown solution algorithm, reference may be made to an embodiment of the multi-source data fusion method for the navigation board described below in the present application.

When the processor 140 executes the multi-source data fusion solution, fusion solution is performed on observation data of a second position, a second velocity and a second attitude solved by the GNSS module 120, observation data of a third position, a third velocity and a third attitude acquired by the external sensor, and results of the first attitude, the first velocity and the first position obtained from the inertial strapdown solution to obtain an attitude, a velocity and a position as navigation results for output; or the processor 140 performs fusion solution on the pseudo-range, the carrier phase and the doppler original observation quantity obtained by the GNSS module 120 and taken as the fourth observation data, observation data of the third attitude, the third velocity and the third position obtained by the external sensor, and results of the first attitude, the first velocity and the first position obtained from the inertial strapdown solution to obtain the attitude, the velocity and the position as the navigation results for output. For the process of the multi-source data fusion solution executed by the processor 140, reference may be made to an embodiment of the multi-source data fusion method for the navigation board described below in the present application. The GNSS module 120 and the inertial sensor 130 are integrated to achieve the combined navigation function of GNSS and INS, and the advantages of high precision and error independence of the satellite navigation and positioning system and the advantages of high dynamic, full automation and high short-term precision of the inertial navigation and positioning system are fully utilized. Based on the integrated hardware design of GNSS and INS, the large misalignment angle initialization algorithm, the inertial strapdown solution algorithm and the multi-source data fusion algorithm, the integrated board design of GNSS and INS is achieved, which makes the navigation and positioning system maintain continuous and reliable high-precision navigation and positioning in harsh environments such as in an environment where the GNSS signal is interrupted, blocked or disturbed. The fault tolerance and reliability of the navigation and positioning system are improved, and needs of the user for continuous navigation and positioning with high precision and high reliability in different application scenarios are satisfied.

For the navigation board provided by this embodiment, the GNSS module, the inertial sensor and the processor are integrated on the PCB board, and the GNSS module and the inertial sensor each are electrically connected to the processor through the circuit on the PCB board, so that the GNSS module and the inertial sensor form an integrated navigation board. The size of the navigation board is designed to be smaller than or equal to the size of the standard GNSS board, so that the space for mounting the GNSS board in the transporter in the related art can be accommodated with the navigation board provided by this embodiment, thereby facilitating the direct replacement of the GNSS board in the transporter with the navigation board. In addition, since the navigation board provided by this embodiment at least includes the data interface which is same as the data interface of the standard GNSS board, after the navigation board replaces the original GNSS board in the transporter, the line originally connected to the data interface of the GNSS board in the transporter is directly connected to the corresponding data interface of the navigation board, so that normal working can be ensured after the GNSS board in the transporter is replaced with the navigation board in this embodiment. The processor can execute the large misalignment angle initialization algorithm, the inertial strapdown solution algorithm and the multi-source data fusion algorithm according to the operation result of the GNSS module, the measurement result of the inertial sensor and the observation result of the external sensor to achieve the combined navigation function of GNSS and INS, and the advantages of high precision and error independence of the satellite navigation and positioning system and high dynamic, full automation and high short-term precision of the inertial navigation and positioning system are fully utilized. Based on the integrated hardware design of GNSS and INS, the large misalignment angle initialization algorithm, the inertial strapdown solution algorithm and the multi-source data fusion algorithm, the integrated board design of GNSS and INS is achieved, which makes the navigation and positioning system maintain continuous and reliable high-precision navigation and positioning in harsh environments such as in an environment where the GNSS signal is interrupted, blocked or disturbed. The fault tolerance and reliability of the navigation and positioning system are improved, and needs of the user for continuous navigation and positioning with high precision and high reliability in different application scenarios are satisfied.

Figure 2:
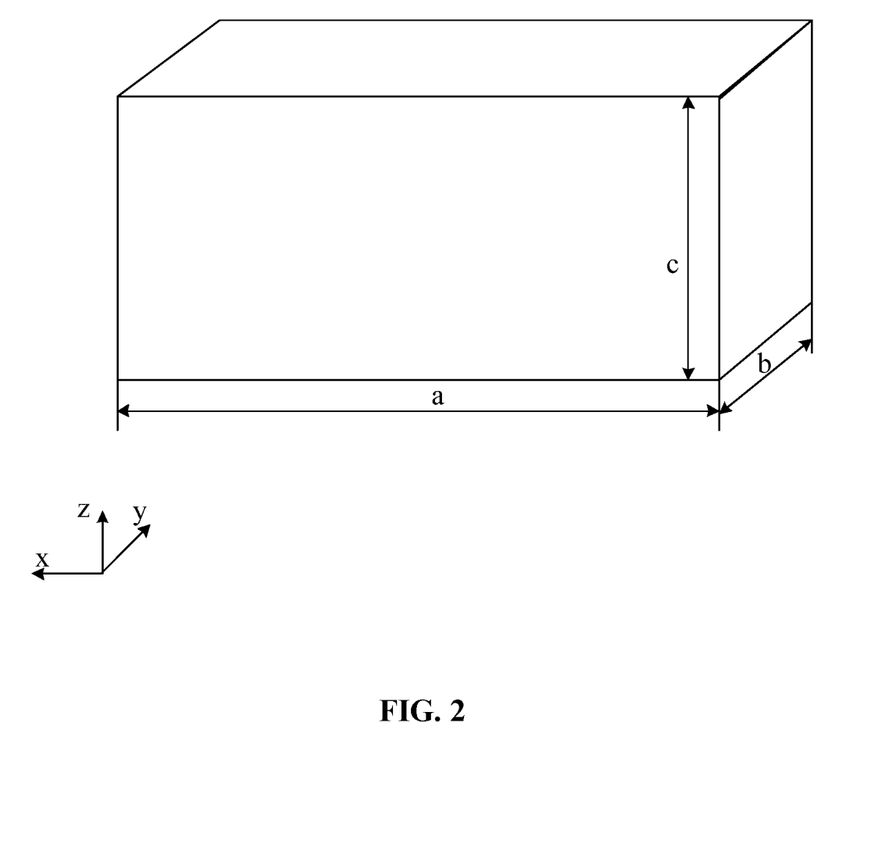
FIG. 2 is a perspective view of a navigation board according to an embodiment of the present application.

FIG. 2 is a perspective view of a navigation board according to an embodiment of the present application. Referring to FIG. 2, based on the above technical solution, optionally, the size of the navigation board includes a length a, a width b, and a height c. The length a of the navigation board is less than or equal to 100 mm, the width b of the navigation board is less than or equal to 60 mm, and the height c of the navigation board is less than or equal to 15 mm.

Referring to FIG. 2, FIG. 2 takes the navigation board being a standard cuboid for example, and it should be noted that the shape of the navigation board may not be the standard cuboid. The length a of the navigation board refers to a maximum size of the navigation board in the x direction, the width b of the navigation board refers to a maximum size of the navigation board in the y direction, and the height c of the navigation board refers to a maximum size of the navigation board in the z direction. In this embodiment, the length a of the navigation board is set to be less than or equal to 100 mm, the width b of the navigation board is set to be less than or equal to 60 mm, and the height c of the navigation board is set to be less than or equal to 15 mm, so that the size of the navigation board is smaller, thereby facilitating the direct replacement of the GNSS board in the transporter with the navigation board.

Optionally, the GNSS module, the inertial sensor, and the processor are patch-type devices, and the GNSS module, the inertial sensor, and the processor are fixedly connected to the PCB board by soldering.

In some embodiments, the size of the patch-type device is usually small, which facilitates the reduction of the size of the navigation board. The GNSS navigation module, the inertial sensor and the processor are fixedly connected to the PCB board in the form of solder patches, which makes the connection between the GNSS navigation module, the inertial sensor, and the processor and the circuit on the PCB board convenient and reliable.

Optionally, the data interface of the navigation board includes at least one of a recommended standard (RS)232, an RS422, an Universal Asynchronous Receiver/Transmitter (UART), an Universal Serial Bus (USB), a network port, a Wireless Fidelity (WIFI), a 4th generation communication system (4G), a 5th generation communication system (5G), a Bluetooth, a Controller Area Network (CAN), and an EVENT. In addition, optionally, the same type and different numbers of data interfaces can be arbitrarily combined and flexibly matched to satisfy the data transmission requirements in different usage scenarios. The data interface of the navigation board may be in the form of a pin header to achieve hardware compatibility with the GNSS board, which is convenient for the replacement and upgrade of the GNSS board in the related art; the data interface of the navigation board may also be in the form of a stamp hole to improve the integration, the anti-vibration and anti-shock performance of the integrated board of GNSS and INS development equipment.

The navigation board acquires external sensor data, differential data, user configuration parameters, trigger signals through one or more of the data interfaces such as RS232, RS422, UART, USB, network port, WIFI, 4G, 5G, Bluetooth, CAN and EVENT; the navigation board may also output the pseudo-range, the carrier and the doppler original observation data of a satellite analyzed by the GNSS module and through one or more of the data interfaces such as RS232, RS422, UART, USB, network port, WIFI, 4G, 5G, Bluetooth, CAN and EVENT; the navigation board may also output a three-dimensional position, a three-dimensional velocity, a heading, a pitch and time result data solved by the GNSS module through one or more of the data interfaces such as RS232, RS422, UART, USB, network port, WIFI, 4G, 5G, Bluetooth, CAN and EVENT; the navigation board may also output a three-dimensional position, a three-dimensional velocity and three-dimensional attitude data after information fusion of GNSS, INS and the external sensor and through one or more of the data interfaces such as RS232, RS422, UART, USB, network port, WIFI, 4G, 5G, Bluetooth, CAN and EVENT; the navigation board may also output differential data, a user configuration parameter, log information, a Pulse Per Second (PPS) signal through one or more of the data interfaces such as RS232, RS422, UART, USB, network port, WIFI, 4G, 5G, Bluetooth, CAN and EVENT.

Figure 3:
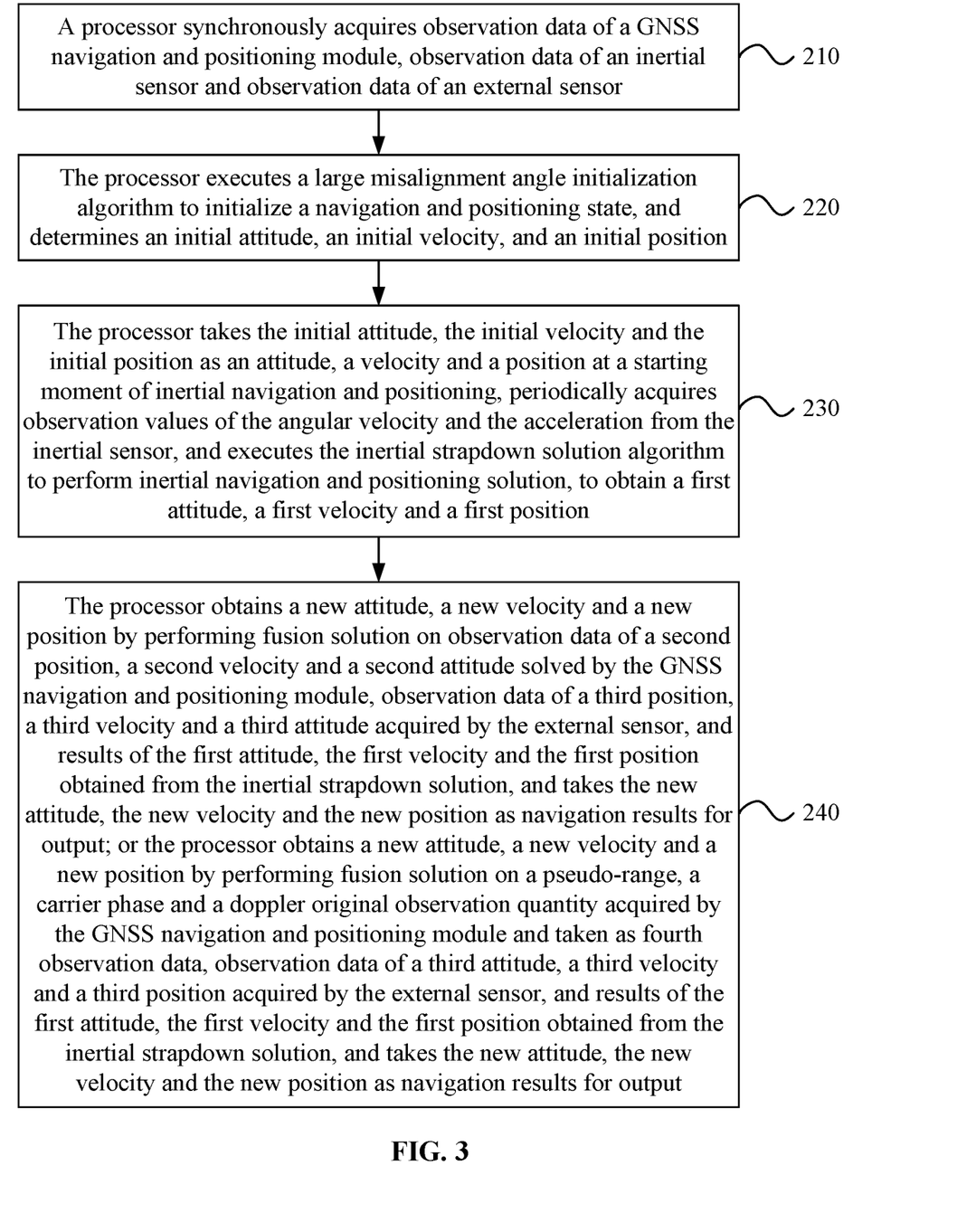
FIG. 3 is a flowchart of a multi-source data fusion method for a navigation board according to an embodiment of the present application.

A multi-source data fusion method for a navigation board is further provided according to an embodiment of the present application, and is executed by the navigation board provided by any of the above embodiments. FIG. 3 is a flowchart of a multi-source data fusion method for a navigation board according to an embodiment of the present application. Referring to FIG. 3, the multi-source data fusion method for the navigation board includes steps described below.

In step 210, a processor synchronously acquires observation data of a GNSS module, observation data of an inertial sensor and observation data of an external sensor.

After the GNSS module of a navigation board tracks a satellite signal, the processor periodically acquires tri-axial acceleration and a tri-axial angular velocity observed by the inertial sensor. A normal sampling frequency is 100 Hz/200 Hz/400 Hz. If the external sensor is accessed, the observation data of the external sensor will be periodically acquired at the same time at the set sampling frequency, and time of the observation data of the inertial sensor, the observation data of the external sensor and the observation and solution information of the GNSS module is synchronized, so that data used in the subsequent steps are all data after time synchronization, to ensure the accuracy of the algorithm calculation.

In step 220, the processor executes a large misalignment angle initialization algorithm to initialize a navigation and positioning state, and determines an initial attitude, an initial velocity, and an initial position.

The navigation board provided by the above embodiment is a combined navigation product of GNSS and INS. For navigation and positioning solution by the combined navigation product of GNSS and INS, the initial position, the initial velocity and the initial attitude need to be set, and the setting of the initial attitude is the key. The large misalignment angle initialization algorithm is provided to complete the attitude angle initialization according to the present application, which can achieve an initial attitude estimation when the navigation board is mounted at any angle, so that the navigation board can be mounted at any angle, which facilitates the direct replacement and upgrade of the GNSS board mounted in the transporter. In some embodiments, a process of the large misalignment angle initialization algorithm is described below.

1) When the navigation board is mounted at any angle, an initial attitude error does not satisfy a condition of small angle, and a filter model is a nonlinear model. A method of transforming an estimator according to the present application is used to convert an estimation of the heading angle into an estimation of two trigonometric functions, and the nonlinear model is linearized, so that the heading angle can be estimated directly by using a standard Kalman filter.

An inertial strapdown solution motion equation is described below.

$$\dot{C}_b^n = C_b^n \Omega_{nb}^b$$

$$\dot{V}^n = C_b^n f^b - (2w_{ie}^n + w_{en}^n) \times V^n + g^n$$

$$\dot{L} = V_N^n/(R_e+h), \dot{\lambda} = V_E^n/((R_e+h)\cos L), \dot{h} = V_U^n \quad (1)$$

Where $C_b^n$ is a Direction Cosine Matrix (DCM) of b system relative to n system, $V^n$ is a three-dimensional velocity vector of the transporter under the n system, L, λ, h is latitude and longitude coordinates of the transporter, $f^b$ is a specific force measured by the inertial sensor, $\Omega_{xy}^z$ is an antisymmetric matrix of an angular velocity $w_{xy}^z$, $g^n$ is a local gravity vector, $w_{ie}^n$ is a projection of a rotation angular velocity of the earth in then system, $w_{en}^n$ is a projection of an angular velocity of the n system relative to the n system in the n system, and $R_e$ is a radius of the earth. In the present application, it is assumed that the earth is a sphere, where the superscript represents derivation.

An estimation model of transforming the heading angle of the estimator is designed below.

$C_h^n$ is defined as DCM from h system to the n system, $C_b^h$ is defined as DCM from the b system to the h system, and the transformation is described below.

$$C_b^n = C_h^n C_b^h, \; C_h^n = \begin{bmatrix} \cos\varphi & \sin\varphi & 0 \\ -\sin\varphi & \cos\varphi & 0 \\ 0 & 0 & 1 \end{bmatrix} \quad (2)$$

DCM errors are defined below.

$$\delta C_b^n = \hat{C}_b^n - C_b^n$$

$$E = \delta C_h^n = \hat{C}_h^n - C_h^n$$

$$\delta C_b^h = \hat{C}_b^h - C_b^h \quad (3)$$

Where superscript ^ represents an estimation.

A heading error is defined as δφ, and a formula is obtained as described below.

$$\sin(\varphi + \delta\varphi) - \sin\varphi = \delta\varphi_s, \; \cos(\varphi + \delta\varphi) - \cos\varphi = \delta\varphi_c \quad (4)$$

$$E = \hat{C}_h^n - C_h^n \quad (5)$$

$$= \begin{bmatrix} \cos(\varphi+\delta\varphi) & \sin(\varphi+\delta\varphi) & 0 \\ -\sin(\varphi+\delta\varphi) & \cos(\varphi+\delta\varphi) & 0 \\ 0 & 0 & 1 \end{bmatrix} - \begin{bmatrix} \cos\varphi & \sin\varphi & 0 \\ -\sin\varphi & \cos\varphi & 0 \\ 0 & 0 & 1 \end{bmatrix}$$

$$= \begin{bmatrix} \delta\varphi_c & \delta\varphi_s & 0 \\ -\delta\varphi_s & \delta\varphi_c & 0 \\ 0 & 0 & 0 \end{bmatrix}$$

An estimation of the heading angle φ is transformed to an estimation of $\delta\varphi_s$ and $\delta\varphi_c$ according to the formula (4), where $\phi_s$ refers to a sinusoidal value of an angle φ and $\phi_c$ refers to a cosine value of the angle φ, that is $\phi_s = \sin\phi$, $\phi_c = \cos\phi$; the estimation algorithm model of transforming the estimation heading angle provided by the present application is achieved according to the formulas (2) (3) (4) and (5).

It is assumed that a pitch angle error δθ and a roll angle error δγ are small, $\vartheta = [\delta\theta \; \delta\gamma \; 0]^T$, where $\vartheta$ represents a three-dimensional column vector formed by the pitch angle error, the roll angle error and the heading angle, where the heading angle error is set to 0, and a formula is obtained as described below.

$$\delta C_b^h = -(\vartheta \times) C_b^h \quad (6)$$

The formulas (5) and (6) are substituted into formula (3), and $\delta C_b^n = [E - (C_h^n + E)(\vartheta \times)] C_b^h$ is obtained from a derivation. When $(\vartheta \times)$ is ignored, a formula is obtained as described below.

$$\delta C_b^n \approx E C_b^h \quad (7)$$

The formulas (7) and (5) are subjected to deviations, respectively, and a formula is obtained as described below.

$$\begin{cases} \delta \dot{C}_b^n = (\dot{E} + E\Omega_{hb}^h) C_b^h \\ \delta \dot{C}_b^n = E C_b^h \Omega_{nb}^n \end{cases} \Rightarrow \dot{E} = E \Omega_{nh}^h \quad (8)$$

$$\Omega_{nh}^h = (0 \; 0 \; -\dot{\phi})^T \times$$

$$\dot{\phi} = (w_{nb,x}^b \sin\gamma - w_{nb,z}^b \cos\gamma)/\cos\theta$$

In combination with the formula (5), error equations are obtained as described below.

$$\delta\dot{\varphi}_s = \dot{\phi}\delta\varphi_s$$

$$\delta\dot{\varphi}_c = -\dot{\phi}\delta\varphi_c \quad (9)$$

The velocity is differentiated to obtain results as described below.

$$\delta V^n = \left[\hat{C}_b^n \hat{f}^b - (2\hat{w}_{ie}^n + \hat{w}_{en}^n) \times \hat{V}^n + \hat{g}^n\right] - \left[C_b^n f^b - (2w_{ie}^n + w_{en}^n) \times V^n + g^n\right] \approx \hat{C}_b^n \hat{f}^b - C_b^n f^b \approx EC_b^h f^b \quad (10)$$

$$\Rightarrow \delta V_E^n = f_y^h \delta\varphi_s + f_x^h \delta\varphi_c$$

$$\delta V_N^n = -f_x^h \delta\varphi_s + f_y^h \delta\varphi_c$$

The latitude and longitude are differentiated to obtain results as described below.

$$\delta L = \delta V_N^n / R_e,$$

$$\delta \lambda = \delta V_E^n / R_{eL} \quad (11)$$

Where $R_{eL} = R_e * \cos L$

Where $V_E^n$ refers to a projection of the transporter velocity in an east direction of the geographic coordinate system, and $V_N^n$ refers to a projection of the transporter velocity in a north direction of the geographic coordinate system.

The Kalman filter of an estimation of transforming the heading angle of the estimator is designed below.

A standard process of the Kalman filter is described below.

① An one-step state prediction is described below.

$$\hat{X}_{k/k-1} = \Phi_{k/k-1} \hat{X}_{k-1} \quad (12)$$

Where, $\hat{X}_{k-1}$ refers to an estimated state variable value at moment (k−1), $\hat{X}_{k|k-1}$, refers to an one-step prediction value of the state variable value from moment (k−1) to moment k, and $\Phi_{k|k-1}$ refers to an one-step state transition matrix from moment (k−1) to moment k.

② A mean square error of one-step state prediction is described below.

$$P_{k/k-1} = \Phi_{k/k-1} P_{k-1} \Phi_{k/k-1}^T + \Gamma_{k-1} Q_{k-1} \Gamma_{k-1}^T \quad (13)$$

Where, $P_{k-1}$ refers to a mean square error array of state estimation at moment (k−1), $P_{k|k-1}$ refers to an estimation one-step mean square error array of one-step state prediction, $\Gamma_{k-1}$ refers to a drive array of system noise at moment (k−1), $Q_{k-1}$ refers to a variance array of system noise at moment (k−1).

③ A filter gain is described below.

$$K_k = P_{k/k-1} H_k^T (H_k P_{k/k-1} H_k^T + R_k)^{-1} \text{ or is abbreviated as}$$
$$K_k = P_{XZ,k/k-1} P_{ZZ,k/k-1}^{-1}. \quad (14)$$

Where, $H_k$ refers to a measurement array at moment k, $R_k$ refers to a variance array of measurement noise, $K_k$ refers to a filter gain array, $P_{XZ,k|k-1}$ refers to a covariance array of a state quantity and a measurement quantity from moment (k−1) to moment k, and $P_{ZZ,k|k-1}$ refers to a measurement mean square error array of one-step prediction.

④ A state estimation is described below.

$$\hat{X}_k = \hat{X}_{k/k-1} + K_k(Z_k - H_k \hat{X}_{k/k-1}) \quad (15)$$

Where, $Z_k$ refers to a measurement quantity at moment k, and $\hat{X}_k$ refers to an estimated state value at moment k.

⑤ A mean square error of state estimation is described below.

$$P_k = (I - K_k H_k) P_{k/k-1} \quad (16)$$

Where, $P_k$ refers to a mean square error array of state estimation at moment k, and I refers to a unit matrix of 6 rows and 6 columns.

A filter state space is selected as described below.

$$x(t) = [\delta\varphi_s \; \delta\varphi_c \; \delta V_E^n \; \delta V_N^n \; \delta L \; \delta\lambda]^T$$

A state transition matrix described below can be extracted according to formulas (9) (10) and (11).

$$F(t) = \begin{bmatrix} 0 & \phi & 0 & 0 & 0 & 0 \\ -\phi & 0 & 0 & 0 & 0 & 0 \\ f_y^h & f_x^h & 0 & 0 & 0 & 0 \\ -f_x^h & f_y^h & 0 & 0 & 0 & 0 \\ 0 & 0 & 0 & 1/R_e & 0 & 0 \\ 0 & 0 & 1/R_{eL} & 0 & 0 & 0 \end{bmatrix}$$

$$\Phi = I_{6\times 6} + F(t) \times dt$$

A position and a velocity measured by an absolute measurement sensor are taken as observation data of the filter, and formulas are obtained as described below.

$$z_P(t) = \begin{bmatrix} L_{strapdown\,solution} - L_{absolute\,measurement\,sensor} \\ \lambda_{strapdown\,solution} - \lambda_{absolute\,measurement\,sensor} \end{bmatrix},$$

$$z_V(t) = \begin{bmatrix} V_{E\,strapdown\,solution} - V_{E\,absolute\,measurement\,sensor} \\ V_{N\,strapdown\,solution} - V_{N\,absolute\,measurement\,sensor} \end{bmatrix}$$

$$H_P(t) = \begin{bmatrix} 0 & 0 & 0 & 0 & 1 & 0 \\ 0 & 0 & 0 & 0 & 0 & 1 \end{bmatrix},$$

$$H_V(t) = \begin{bmatrix} 0 & 0 & 1 & 0 & 0 & 0 \\ 0 & 0 & 0 & 1 & 0 & 0 \end{bmatrix}$$

The above is the filter model and the modeling process of the estimation algorithm of transforming the heading angle of the estimator.

Figure 4:
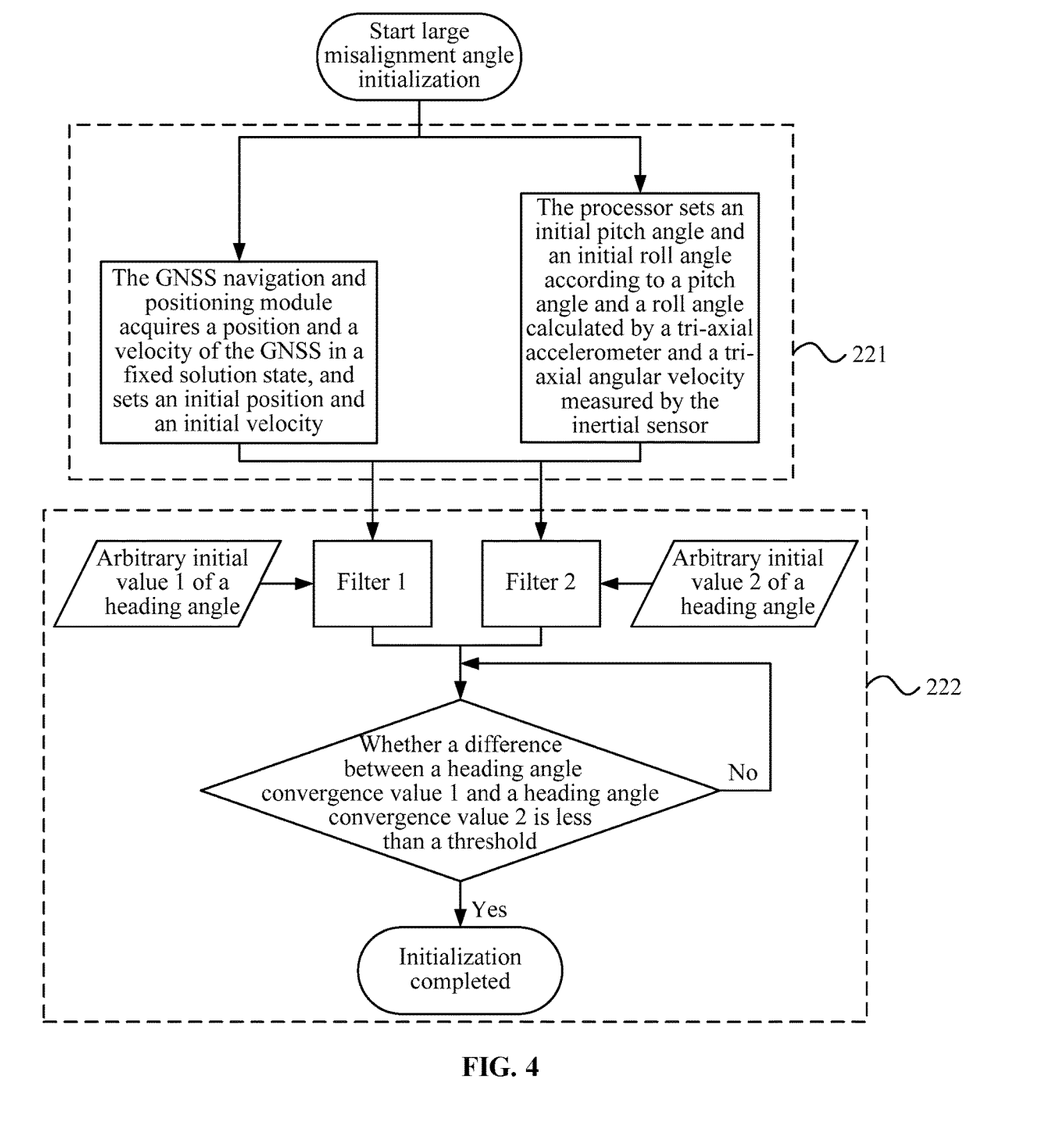
FIG. 4 is a flowchart of step 220 according to an embodiment of the present application.

In some embodiments, FIG. 4 is a flowchart of step 220 according to an embodiment of the present application, and referring to FIG. 4, step 220 may include steps described below.

In step 221, the GNSS module acquires a position and a velocity of the GNSS in a fixed solution state, and sets an initial position and an initial velocity; the processor sets an initial pitch angle and an initial roll angle according to a pitch angle and a roll angle calculated by a tri-axial acceleration and a tri-axial angular velocity measured by the inertial sensor, and an initial heading angle is set to an arbitrary value;

In step 222, two filters are provided, initial heading values of the two filters are set differently and initial values of the two filters are the same except for the initial heading values. The two filters operate at the same time, and in response to the two filters each reaching a steady state and the determining condition of the heading angle estimation being satisfied, the solution of the large misalignment angle initialization algorithm is interrupted, and an estimated heading angle at this time is used as the initial heading of the navigation and positioning solution.

In some embodiments, the filter in step 222 is the above Kalman filter. Referring to FIG. 4, in step 222, a filter 1 and a filter 2 may be set separately, and a heading angle of the filter 1 is set to an arbitrary value 1 and a heading angle of the filter 2 is set to an arbitrary value 2. Where the arbitrary value 1 and the arbitrary value 2 are different. Whether the difference between a heading angle convergence value 1 obtained by the filter 1 and a heading angle convergence value 2 obtained by the filter 2 is less than a threshold is determined, where the threshold may be set in advance, so as to determine whether the initialization is completed, that is, when the difference between the heading angle convergence value 1 and the heading angle convergence value 2 is less than the threshold, the initialization is completed.

In step 230, the processor takes the initial attitude, the initial velocity and the initial position as an attitude, a velocity and a position at a starting moment of inertial navigation and positioning, periodically acquires observation values of the angular velocity and the acceleration from the inertial sensor, and executes the inertial strapdown solution algorithm to perform inertial navigation and positioning solution, to obtain a first attitude, a first velocity and a first position.

Where for the inertial strapdown solution algorithm, reference may be made to formulas (1) to (11) in the large misalignment angle initialization algorithm.

In step 240, the processor obtains a new attitude, a new velocity and a new position by performing fusion solution on observation data of a second position, a second velocity and a second attitude solved by the GNSS module, observation data of a third position, a third velocity and a third attitude acquired by the external sensor, and results of the first attitude, the first velocity and the first position obtained from the inertial strapdown solution, and takes the new attitude, the new velocity and the new position as navigation results for output; or the processor obtains a new attitude, a new velocity and a new position by performing fusion solution on a pseudo-range, a carrier phase and a doppler original observation quantity acquired by the GNSS module and taken as fourth observation data, observation data of a third attitude, a third velocity and a third position acquired by the external sensor, and results of the first attitude, the first velocity and the first position obtained from the inertial strapdown solution, and takes the new attitude, the new velocity and the new position as navigation results for output.

Optionally, in the above step 240, the step in which the processor obtains a new attitude, a new velocity and a new position by performing fusion solution on observation data of a second position, a second velocity and a second attitude solved by the GNSS module, observation data of a third position, a third velocity and a third attitude acquired by the external sensor, and results of the first attitude, the first velocity and the first position obtained from the inertial strapdown solution, and takes the new attitude, the new velocity and the new position as navigation results for output include a step described below:

Constructing, by the processor, a Kalman filter model according to a differential equation of the inertial strapdown solution algorithm, and simultaneously performing time update of the Kalman filter at a frequency of inertial strapdown solution, a difference between the first position and the second position and a difference between the first velocity and the second velocity being taken as observation quantities of the Kalman filter to update measurement of the Kalman filter, errors of an attitude, a velocity and a position obtained by the inertial strapdown algorithm and a zero bias error of the inertial sensor being estimated, and the corresponding errors being fed back and corrected; and a difference between the first position and the third position, a difference between the first velocity and the third velocity, and a difference between the first attitude and the third attitude being taken as the observation quantities of the Kalman filter again to update and correct the measurement of the Kalman filter, and the corrected attitude, velocity and position of inertial navigation being outputted as navigation results respectively.

Optionally, in the above step 240, the step in which the processor obtains a new attitude, a new velocity and a new position by performing fusion solution on a pseudo-range, a carrier phase and a doppler original observation quantity acquired by the GNSS module and taken as fourth observation data, observation data of a third attitude, a third velocity and a third position acquired by the external sensor, and results of the first attitude, the first velocity and the first position obtained from the inertial strapdown solution, and takes the new attitude, the new velocity and the new position as navigation results for output includes a step described below:

Constructing, by the processor, a Kalman filter model according to a differential equation of the inertial strapdown solution algorithm, and simultaneously performing time update of the Kalman filter at a frequency of inertial strapdown solution, the pseudo-range, the carrier phase and the doppler original observation quantity of the fourth observation being taken as observation quantities of the Kalman filter to update measurement of the Kalman filter, errors of an attitude, a velocity and a position obtained by the inertial strapdown algorithm and a zero bias error of the inertial sensor being estimated, and the corresponding errors being fed back and corrected; and a difference between the first position and the third position, a difference between the first velocity and the third velocity, and a difference between the first attitude and the third attitude being taken as the observation quantities of the Kalman filter again to update and correct the measurement of the Kalman filter, and the corrected attitude, velocity and position of inertial navigation being outputted as navigation results respectively.

A multi-source data fusion method for a navigation board is provided by this embodiment. The method of completing the attitude angle initialization through the large misalignment angle initialization algorithm can achieve the initial attitude estimation when the navigation board is mounted at any angle, achieving the mounting of the navigation board at any angle, and facilitating direct replacement and upgrade of the GNSS board mounted in the transporter. The processor obtains a new attitude, a new velocity and a new position by performing fusion solution on observation data of a second position, a second velocity and a second attitude solved by the GNSS module, observation data of a third position, a third velocity and a third attitude acquired by the external sensor, and results of the first attitude, the first velocity and the first position obtained from the inertial strapdown solution, and takes the new attitude, the new velocity and the new position as navigation results for output; or the processor obtains a new attitude, a new velocity and a new position by performing fusion solution on a pseudo-range, a carrier phase and a doppler original observation quantity acquired by the GNSS module and taken as fourth observation data, observation data of a third attitude, a third velocity and a third position acquired by the external sensor, and results of the first attitude, the first velocity and the first position obtained from the inertial strapdown solution, and takes the new attitude, the new velocity and the new position as navigation results for output. Therefore, the combined navigation function of GNSS and INS can be achieved, and the advantages of high precision and error independence of the satellite navigation and positioning system and high dynamic, full automation and high short-term precision of the inertial navigation and positioning system are fully utilized. Based on the integrated hardware design of GNSS and INS, the large misalignment angle initialization algorithm, the inertial strapdown solution algorithm and the multi-source data fusion algorithm, the integrated board design of GNSS and INS is achieved, which makes the navigation and positioning system maintain continuous and reliable high-precision navigation and positioning in harsh environments such as in an environment where the GNSS signal is interrupted, blocked or disturbed. The fault tolerance and reliability of the navigation and positioning system are improved, and needs of the user for continuous navigation and positioning with high precision and high reliability in different application scenarios are satisfied. When the processor calculates the navigation structure, data of the external sensor is also fused, therefore, the present application has excellent scalability to satisfy the needs of the user for the multi-source sensor fusion navigation and positioning.

Based on the above technical solution, optionally, in the above step 240, when the GNSS module acquires the pseudo-range, carrier phase and the doppler original observation quantity, position information and velocity information of a user at a current epoch moment is obtained according to inertial strapdown solution and combined with position information and velocity information of a satellite obtained from satellite ephemeris data to obtain unit vector information and pseudo-range information in a line-of-sight direction from the user to the satellite through calculation, then doppler frequency shift and code phase offset in the line-of-sight direction are obtained, the doppler frequency shift and the code phase offset are taken as a center of a search range, the search range is set according to uncertainty of the position information and velocity information of the inertial strapdown solution, and a local code numerical controlled oscillator or a carrier numerical controlled oscillator is controlled to perform searching within the set search range.

In some embodiments, inertial directional positioning and navigation based on the inertial sensor can assist the GNSS module to acquire the pseudo-range, the carrier phase and the doppler original observation quantity, and the acquisition can be divided into two parts of a coarse acquisition and a fine acquisition.

In some embodiments, the coarse acquisition adopts a cyclic correlation acquisition method based on fast Fourier transform, the inertial directional positioning and navigation based on the inertial sensor and satellite ephemeris predict the doppler information together, and search performance of a receiver is improved, so that the frequency search range is reduced to achieve the purpose of fast acquisition of the signal. In the coarse-acquisition phase, the inertial directional positioning and navigation based on the inertial sensor is combined with ephemeris to provide velocities and accelerations of the transporter and the satellite, so that the doppler frequency shift Δf can be calculated, and the calculated frequency shift amount is fed back to the carrier Numerical Controlled Oscillator (NCO), which adjusts a center value of a local carrier frequency together. In order to make better use of frequency shift estimation amount provided by the inertial directional positioning and navigation based on the inertial sensor, information fusion of the inertial directional positioning and navigation based on the inertial sensor and the receiver should be placed at the front of the acquisition process. An estimated value of the doppler frequency shift Δf due to the transporter motion and an estimated value of the local carrier $f_c$ are described below.

$$\Delta f = \frac{1}{\lambda_{L_1}} * (V_2 - V_1) * e \quad (7\text{-}1)$$

$$f_c = f_{L_1} + \Delta f \quad (7\text{-}2)$$

In the formulas, $\lambda_{L_1}$ is a wavelength of the carrier of the GNSS signal in L1 band, $f_{L_1}$ is a frequency of the carrier in the L1 band, V2 is a moving velocity of the transporter, V1 is the satellite velocity, and e is a unit line-of-sight vector of the satellite transporter.

The velocity V2 of the transporter can be estimated through the inertial velocity information output by the INS; the velocity V1 of the satellite can be obtained through the solution of the satellite ephemeris; the INS is combined with the satellite position information provided by the ephemeris to calculate the vector e of in the line-of-sight direction of the transporter and the satellite, and combining the formula (7-1) and the formula (7-2) can accurately estimate the carrier center frequency. Therefore, the frequency search range is greatly reduced to achieve the purpose of fast acquisition.

For the fine acquisition, it is assumed that a highest frequency component $x_N(k)$ exists in 1 ms telegraph text at moment N, a strong-frequency component $x_{N+T}(k)$ exists at moment (N+T). A fine frequency can be obtained by a phase method to satisfy the requirement of tracking loop, and an initial phase $\theta_N(k)$ of $x_N(k)$ can be calculated by Discrete Fourier Transform (DFT).

$$\theta_N(k) = \arctan\left(\frac{I_m(x_N(k))}{R_e(x_N(k))}\right) \quad (7\text{-}3)$$

In the formula, $I_m$ refers to an imaginary part and $R_e$ refers to a real part, and an initial phase $\theta_{N+T}(k)$ of $x_{N+T}(k)$ at moment (N+T) is described below.

$$\theta_{N+T}(k) = \arctan\left(\frac{I_m(x_{N+T}(k))}{R_e(x_{N+T}(k))}\right) \quad (7\text{-}4)$$

The fine frequency can be calculated according to the two phases, which is described below.

$$f' = \frac{\theta_{N+T}(k) - \theta_N(k)}{2 * \pi * T} \quad (7\text{-}5)$$

A precise frequency of the carrier at this time is described below.

$$f_T = f + f' \quad (7\text{-}6)$$

Position information and velocity information solved by the inertial directional positioning and navigation based on the inertial sensor are combined with satellite position information and velocity information solved through the GNSS ephemeris information to calculate and obtain the doppler frequency shift information in the line-of-sight direction from the user to the satellite. The doppler frequency shift information in the line-of-sight direction from the user to the satellite is input into the carrier NCO to weaken the doppler shift of the GNSS signal and reduce the dynamic of the carrier tracking of the GNSS board. Bandwidth of the carrier loop becomes narrow, which can effectively improve the tracking performance and anti-interference ability of the GNSS receiver under the high dynamic condition, and enhance the practicability of the GNSS board. The inertial directional positioning and navigation based on the inertial sensor assists in signal acquisition and tracking of the GNSS module, which can greatly shorten the signal acquisition duration and improve the acquisition ability. The user dynamic information solved by the inertial directional positioning and navigation based on the inertial sensor assists in the tracking loop of the GNSS receiver, which can improve the stability of the loop tracking of the GNSS receiver and effectively enhance anti-interference ability of the GNSS receiver.

Figure 5:
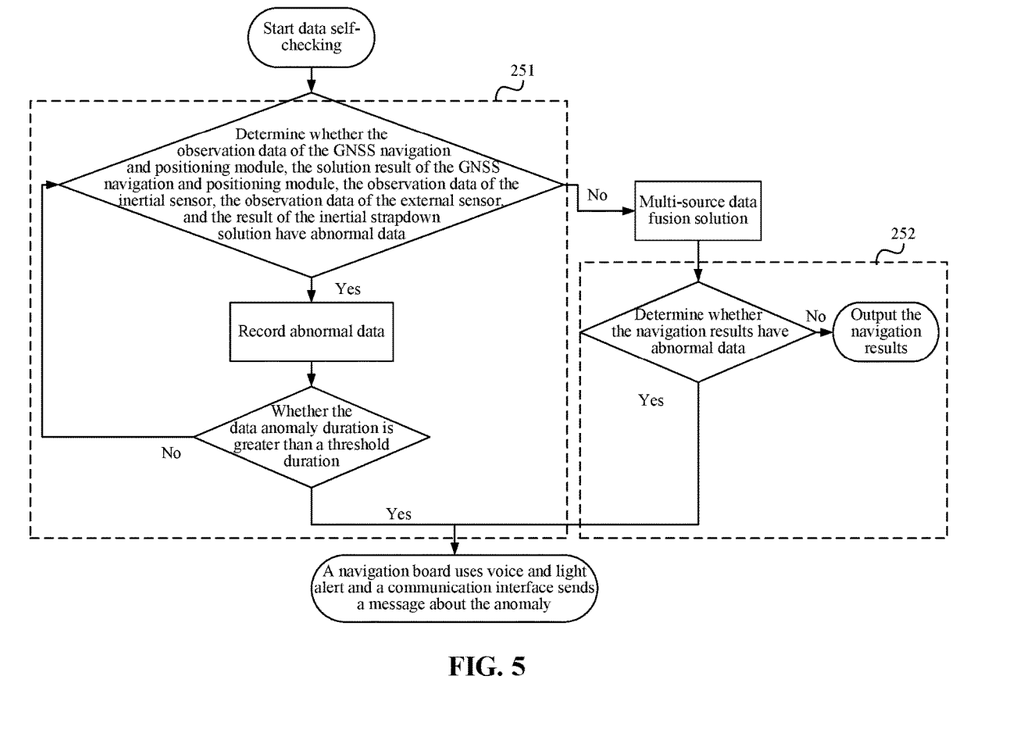
FIG. 5 is a flowchart of data self-checking process according to an embodiment of the present application.

Optionally, the multi-source data fusion method for the navigation board further includes a data self-checking process. FIG. 5 is a flowchart of the data self-checking process according to an embodiment of the present application. Referring to FIG. 5, the data self-checking process includes steps described below.

Before step 240:

In step 251, anomaly data detection is performed on the observation data of the GNSS module, the solution result of the GNSS module, the observation data of the inertial sensor, the observation data of the external sensor, and the result of the inertial strapdown solution.

In some embodiments, step 251 includes determining whether the observation data of the GNSS module, the solution result of the GNSS module, the observation data of the inertial sensor, the observation data of the external sensor, and the result of the inertial strapdown solution have abnormal data, if the observation data of the GNSS module, the solution result of the GNSS module, the observation data of the inertial sensor, the observation data of the external sensor, and the result of the inertial strapdown solution have abnormal data, the abnormal data is recorded, and whether the data anomaly duration is greater than a threshold duration e is determined, if the data anomaly duration is greater than the threshold duration, a voice and light alert of the navigation board is used/a communication interface sends the message about the anomaly.

After step 240, the data self-checking process further includes steps described below.

In step 252, anomaly data detection is performed on the navigation results.

In some embodiments, step 252 includes determining whether the navigation results have abnormal data, if the navigation results have abnormal data, the voice and light alert of the navigation board is used/the communication interface sends the message about the anomaly, and if the navigation results do not have abnormal data, the navigation results are output.

In some embodiments, different from the GNSS board in the related art merely having single GNSS satellite observation information, in addition to the GNSS satellite observation information, the navigation board of this embodiment further includes information about high-frequency acceleration and angular velocity output by the inertial sensor, and absolute or relative three-dimensional space observation information acquired from the external sensors such as an odometer, a millimeter wave radar, a lidar and a visual sensor. The different observation information is fused through the combined navigation processing apparatus, and the different observation information is corrected for each other, so that anomaly detection is performed on observation data of the inertial sensor, the observation data of the GNSS module, the positioning result of the GNSS module, the observation data of the external sensor, and the navigation and positioning result of the multi-source fusion solution in the integrated navigation board of the GNSS and INS. Compared with anomaly data detection of the GNSS board in the related art, the anomaly data detection of the integrated navigation board of the GNSS and INS is more accurate and complete, and the navigation and positioning result is more reliable.

1) GNSS Anomaly Data Detection

Differential age, Dilution of Precision (DOP), signal-to-noise ratio, the number of visible satellites, the number of satellites in use, standard deviation of position, standard deviation of velocity and standard deviation of heading output by the GNSS module are weighted, and the GNSS abnormal data is distinguished by setting a reasonable threshold; and the GNSS observation data information of the Kalman filter is analyzed, and the GNSS abnormal data is distinguished by setting a reasonable threshold.

2) Anomaly Data Detection of the Inertial Sensor

The inertial sensor data in the present application is a digital signal, and the Anomaly of the inertial sensor data usually includes communication anomaly and inertial sensor data error.

The identification (ID) or a certain characteristic value of the device is read at the same time when the acceleration and the angular velocity are read. If the ID or the certain characteristic value of the device is inconsistent with an expectation, a communication failure of the inertial sensor can be determined, and the acceleration and the angular velocity are not available; magnitudes of the acceleration and the angular velocity are determined when the inertial sensor data is used, and if the data exceeds a set threshold, the acceleration and the angular velocity are not available.

3) Anomaly Data Detection of the External Sensor

The size of the external sensor data is determined when the external sensor data is used. If the data exceeds a set threshold, the external sensor data is not available; and the observation data information of the external sensor of the Kalman filter is analyzed, and the abnormal data of the external sensor is distinguished by setting a reasonable threshold.

4) Anomaly Data Detection of the Multi-Source Fusion Solution Result

The multi-source fusion solution result, the GNSS navigation and positioning result, and the absolute or relative three-dimensional space observation information acquired from the external sensors such as the odometer, the millimeter wave radar, the lidar and the visual sensor are subjected to redundancy detection such as taking two from three, taking three from four, and whether the multi-source fusion solution result or other data is apparently abnormal is determined.

Based on the above technical solution, optionally, the step in which the processor can synchronously acquire the observation data of the GNSS module, the observation data of the inertial sensor and the observation data of the external sensor, includes a step described below.

synchronizing, by the processor, a time series of the processor according to a second pulse signal and time information of the GNSS module, so that time of the observation data of the inertial sensor, the observation data of the external sensor, the observation data of the GNSS module are synchronized with time of solution information.

In some embodiments, after the GNSS module of the integrated navigation board of GNSS and INS tracks the satellite signal, the processor periodically acquires a tri-axial acceleration and a tri-axial angular velocity observed by an Inertial Measurement Unit (IMU) inertial sensor. The usual sampling frequency is 100 Hz/200 Hz/400 Hz. If the external sensor is accessed, the observation data of the external sensor is periodically acquired at a set sampling frequency, and PPS second pulse signal and the GNSS time information of the GNSS module are simultaneously acquired. The time series of the processor is synchronized based on the GNSS time information and the PPS second pulse signal, so that the time synchronization of the observation data of the inertial sensor, the observation data of the external sensor, the observation data of the GNSS module and the resolution information is achieved.

This embodiment further provides a transporter on which the navigation board provided by any of the above embodiments is mounted at any angle.

In some embodiments, different transporter types have different kinematics models, and modeling can be performed according to the motion characteristics of different transporters, other observation information can be obtained in addition to information of the GNSS module and the external sensor, for example, a side velocity of the passenger car is basically zero, and the navigation precision of the inertial navigation system based on the inertial sensor without the observation data of the GNSS module and the external sensor can be improved.

When the positioning of the GNSS module is stable, the moving and static state of the transporter can be determined by the velocity of the GNSS module, so that the inertial sensor data can be dynamically and statically marked. A machine learning model is established to train the model through marked inertial sensor data when the positioning of the GNSS module is stable, and when the information of the GNSS module and the external sensor does not exist, the machine learning model performs dynamic and static determination by identifying data characteristics of the IMU. When the transporter is stationary, zero-velocity observation information is virtualized to improve the navigation precision of the inertial navigation system based on the inertial sensor.

The mounting transporters are classified, and the different types of transporters are modeled. The navigation board provided in any of the above embodiments can be applied to passenger cars, commercial vehicles, logistics vehicles, forklifts, snow removal vehicles, sprinklers, sanitation vehicles, muck trucks, fire trucks, shuttle buses, rotor drones, fixed-wing drones, unmanned boats, unmanned sweepers, tractors, rice transplanters, seeders, harvesters, bulldozers, graders, excavators, pavers, road rollers, loaders, cranes, drilling machines and other different transporters.

For the navigation board, the multi-source data fusion method for the navigation board and the transporter provided by this embodiment, the GNSS module, the inertial sensor and the processor are integrated on the PCB board, and the GNSS module and the inertial sensor each are electrically connected to the processor through the circuit on the PCB board, so that the GNSS module and the inertial sensor form an integrated navigation board. The size of the navigation board is designed to be smaller than or equal to the size of the standard GNSS board, so that the space for mounting the GNSS board in the transporter in the related art can be accommodated with the navigation board provided by this embodiment, thereby facilitating the direct replacement of the GNSS board in the transporter with the navigation board. In addition, since the navigation board provided by this embodiment at least includes the data interface which is same as the data interface of the standard GNSS board, after the navigation board replaces the original GNSS board in the transporter, the line originally connected to the data interface of the GNSS board in the transporter is directly connected to the corresponding data interface of the navigation board, so that normal working can be ensured after the GNSS board in the transporter is replaced with the navigation board in this embodiment. The processor can execute the large misalignment angle initialization algorithm, the inertial strapdown solution algorithm and the multi-source data fusion algorithm according to the operation result of the GNSS module, the measurement result of the inertial sensor and the observation result of the external sensor to achieve the combined navigation function of GNSS and INS, and the advantages of high precision and error independence of the satellite navigation and positioning system and high dynamic, full automation and high short-term precision of the inertial navigation and positioning system are fully utilized. Based on the integrated hardware design of GNSS and INS, the large misalignment angle initialization algorithm, the inertial strapdown solution algorithm and the multi-source data fusion algorithm, the integrated board design of GNSS and INS is achieved, which makes the navigation and positioning system maintain continuous and reliable high-precision navigation and positioning in harsh environments such as in an environment where the GNSS signal is interrupted, blocked or disturbed. The fault tolerance and reliability of the navigation and positioning system are improved, and needs of the user for continuous navigation and positioning with high precision and high reliability in different application scenarios are satisfied.

What is claimed is:

1. A multi-source data fusion method for a navigation board, performed by the navigation board, wherein the navigation board includes a printed circuit board, a Global Navigation Satellite System (GNSS) module, an inertial sensor, a processor, and a data interface, wherein the data interface of the navigation board comprises an external sensor interface configured to receive from an external sensor at least one of odometer data, millimeter-wave radar data, lidar data, visual sensor data, or map data, wherein the GNSS module, the inertial sensor and the processor are integrated on the printed circuit board, and the GNSS module and the inertial sensor are electrically connected to the processor through a circuit on the printed circuit board, and the method comprising:

acquiring synchronously, by the processor, observation data of the external sensor, the inertial sensor and the GNSS module, wherein the external sensor includes at least one of an odometer, a millimeter wave radar, a lidar or a visual sensor;

executing, by the processor, a large misalignment angle initialization algorithm to initialize a navigation and positioning state, and determining an initial attitude, an initial velocity, and an initial position;

acquiring periodically, by the processor, observation values of an angular velocity and an acceleration of the inertial sensor by taking the initial attitude, the initial velocity and the initial position respectively as an attitude, a velocity and a position at a starting moment of inertial navigation and positioning, and executing an inertial strapdown solution algorithm to perform an inertial navigation and positioning solution on the basis of the observation values of the angular velocity and the acceleration of the inertial sensor to obtain a first attitude, a first velocity and a first position; and obtaining, by the processor, a new attitude, a new velocity and a new position by performing a fusion solution on observation data of a second position, a second velocity and a second attitude solved by the GNSS module, observation data of a third position, a third velocity and a third attitude acquired by the external sensor, and the first attitude, the first velocity and the first position; and taking the new attitude, the new velocity and the new position as navigation results for output, wherein executing, by the processor, the large misalignment angle initialization algorithm to initialize the navigation and positioning state, and determining the initial attitude, the initial velocity, and the initial position, comprising:

acquiring, by the GNSS module, a position and a velocity of the GNSS in a fixed solution state, and setting the initial position and the initial velocity; setting, by the processor, an initial pitch angle and an initial roll angle according to a pitch angle and a roll angle calculated by a tri-axial acceleration and a ti-axial angular velocity measured by the inertial sensor, and setting an initial heading angle to an arbitrary value; and configuring two filters, wherein initial heading values of the two filters are set differently, and the two filters simultaneously operate, wherein a case where the two filters each reaches a steady state and a determining condition of a heading angle estimation is satisfied, the processor interrupting solution of the large misalignment angle initialization algorithm, and taking a heading angle estimated by the processor as an initial heading of navigation and positioning solution in response to interrupting the solution of the large misalignment angle initialization algorithm.

2. A multi-source data fusion method for a navigation board, performed by the navigation board, wherein the navigation board includes a printed circuit board, a Global Navigation Satellite System (GNSS) module, an inertial sensor, a processor, and a data interface, wherein the data interface of the navigation board comprises an external sensor interface configured to receive from an external sensor at least one of odometer data, millimeter-wave radar data, lidar data, visual sensor data, or map data, wherein the GNSS module, the inertial sensor and the processor are integrated on the printed circuit board, and the GNSS module and the inertial sensor are electrically connected to the processor through a circuit on the printed circuit board, and the method comprising:

acquiring synchronously, by the processor, observation data of the external sensor, the inertial sensor and the GNSS module, wherein the external sensor includes at least one of an odometer, a millimeter wave radar, a lidar or a visual sensor;

executing, by the processor, a large misalignment angle initialization algorithm to initialize a navigation and positioning state, and determining an initial attitude, an initial velocity, and an initial position;

acquiring periodically, by the processor, observation values of an angular velocity and an acceleration of the inertial sensor by taking the initial attitude, the initial velocity and the initial position respectively as an attitude, a velocity and a position at a starting moment of inertial navigation and positioning, and executing an inertial strapdown solution algorithm to perform an inertial navigation and positioning solution on the basis of the observation values of the angular velocity and the acceleration of the inertial sensor, to obtain a first attitude, a first velocity and a first position;

obtaining, by the processor, a new attitude, a new velocity and a new position by performing a fusion solution on fourth observation data, observation data of a third attitude, a third velocity and a third position acquired by the external sensor, and the first attitude, the first velocity and the first position; and taking the new attitude, the new velocity and the new position as navigation results for output, wherein the fourth observation data comprises a pseudo-range, a carrier phase and a doppler original observation quantity acquired by the GNSS module, wherein executing, by the processor, the large misalignment angle initialization algorithm to initialize the navigation and positioning state, and determining the initial attitude, the initial velocity, and the initial position comprise:

acquiring, by the GNSS module, a position and a velocity of the GNSS in a fixed solution state, and setting the initial position and the initial velocity; setting, by the processor, an initial pitch angle and an initial roll angle according to a pitch angle and a roll angle calculated by a tri-axial acceleration and a tri-axial angular velocity measured by the inertial sensor, and setting an initial heading angle to an arbitrary value; and configuring two filters, wherein initial heading values of the two filters are set differently, and the two filters simultaneously operate, wherein a case where the two filters each reaches a steady state and a determining condition of a heading angle estimation is satisfied, the processor interrupting solution of the large misalignment angle initialization algorithm, and taking a heading angle estimated by the processor as an initial heading of navigation and positioning solution in response to interrupting the solution of the large misalignment angle initialization algorithm.

3. The multi-source data fusion method for the navigation board according to claim 2, wherein obtaining, by the processor, the new attitude, the new velocity and the new position by performing the fusion solution on the fourth observation data, the observation data of the third attitude, the third velocity and the third position acquired by the external sensor, and the first attitude, the first velocity and the first position, and taking the new attitude, the new velocity and the new position as the navigation results for output, wherein fourth observation data comprises a pseudo-range, a carrier phase and a doppler original observation quantity acquired by the GNSS module, comprise:

in a case where the GNSS module acquires the pseudo-range, the carrier phase and the doppler original observation quantity, obtaining position and velocity information of a user at a current epoch moment according to inertial strapdown solution, calculating, by combining the position and velocity information of the user with position and velocity information of a satellite obtained from satellite ephemeris data, unit vector and pseudo-range information in a line-of-sight direction from the user to the satellite, obtaining doppler frequency shift and code phase offset in the line-of-sight direction as a center of a search range, and setting the search range according to uncertainty of the position and velocity information which is obtained by the inertial strapdown solution, and controlling a local code numerical controlled oscillator or a carrier numerical controlled oscillator to perform searching within the set search range.

4. The multi-source data fusion method for the navigation board according to claim 1, wherein before the processor outputs the navigation results, the multi-source data fusion method for the navigation board further comprises: performing an anomaly data detection on the observation data of the GNSS module, a solution result of the GNSS module, the observation data of the inertial sensor, the observation data of the external sensor, and a result of the inertial strapdown solution; and after the processor outputs the navigation results, the multi-source data fusion method for the navigation board further comprises: performing the anomaly data detection on the navigation results.

5. The multi-source data fusion method for the navigation board according to claim 1, wherein acquiring synchronously, by the processor, the observation data of the external sensor, the inertial sensor and the GNSS module comprises:
synchronizing, by the processor, a time series of the processor according to a second pulse signal and time information of the GNSS module, so that time of the observation data of the inertial sensor, the observation data of the external sensor, the observation data of the GNSS module are synchronized with time of solution information.

6. The multi-source data fusion method for the navigation board according to claim 1, wherein obtaining, by the processor, the new attitude, the new velocity and the new position by performing the fusion solution on the observation data of the second position, the second velocity and the second attitude solved by the GNSS module, the observation data of the third position, the third velocity and the third attitude acquired by the external sensor, and the first attitude, the first velocity and the first position, and taking the new attitude, the new velocity and the new position as the navigation results for output comprise:
constructing, by the processor, a Kalman filter model according to a differential equation of the inertial strapdown solution algorithm, and simultaneously performing time update of the Kalman filter at a frequency of the inertial strapdown solution, updating measurement of the Kalman filter by taking a difference between the first position and the second position and a difference between the first velocity and the second velocity as observation quantities of the Kalman filter, estimating errors of an attitude, a velocity and a position obtained by the inertial strapdown algorithm and a zero bias error of the inertial sensor, and feeding back and correcting the corresponding errors; and
updating and correcting the measurement of the Kalman filter again by taking a difference between the first position and the third position, a difference between the first velocity and the third velocity, and a difference between the first attitude and the third attitude as the observation quantities of the Kalman filter, and outputting the corrected attitude, velocity and position of inertial navigation as the navigation results respectively.

7. The multi-source data fusion method for the navigation board according to claim 2, wherein obtaining, by the processor, the new attitude, the new velocity and the new position by performing the fusion solution on the fourth observation data, the observation data of the third attitude, the third velocity and the third position acquired by the external sensor, and the first attitude, the first velocity and the first position, and taking the new attitude, the new velocity and the new position as the navigation results for output, wherein the fourth observation data comprises the pseudo-range, the carrier phase and the doppler original observation quantity acquired by the GNSS module, comprise:
constructing, by the processor, a Kalman filter model according to a differential equation of the inertial strapdown solution algorithm, and simultaneously performing time update of the Kalman filter at a frequency of inertial strapdown solution, updating measurement of the Kalman filter by taking the pseudo-range, the carrier phase and the doppler original observation quantity of the fourth observation as observation quantities of the Kalman filter, estimating errors of an attitude, a velocity and a position obtained by the inertial strapdown algorithm and a zero bias error of the inertial sensor, and feeding back and correcting the corresponding errors; and
updating and correcting the measurement of the Kalman filter again by taking a difference between the first position and the third position, a difference between the first velocity and the third velocity, and a difference between the first attitude and the third attitude as the observation quantities of the Kalman filter, and outputting the corrected attitude, velocity and position of inertial navigation as the navigation results respectively.

8. The multi-source data fusion method for the navigation board according to claim 2, wherein before the processor outputs the navigation results, the multi-source data fusion method for the navigation board further comprises: performing an anomaly data detection on the observation data of the GNSS module, a solution result of the GNSS module, the observation data of the inertial sensor, the observation data of the external sensor, and a result of the inertial strapdown solution; and
after the processor outputs the navigation results, the multi-source data fusion method for the navigation board further comprises: performing the anomaly data detection on the navigation results.

9. The multi-source data fusion method for the navigation board according to claim 2, wherein acquiring synchronously, by the processor, the observation data of the external sensor, the inertial sensor and the GNSS module comprises:
synchronizing, by the processor, a time series of the processor according to a second pulse signal and time information of the GNSS module, so that time of the observation data of the inertial sensor, the observation data of the external sensor, the observation data of the GNSS module are synchronized with time of solution information.

* * * * *